Figure 1:
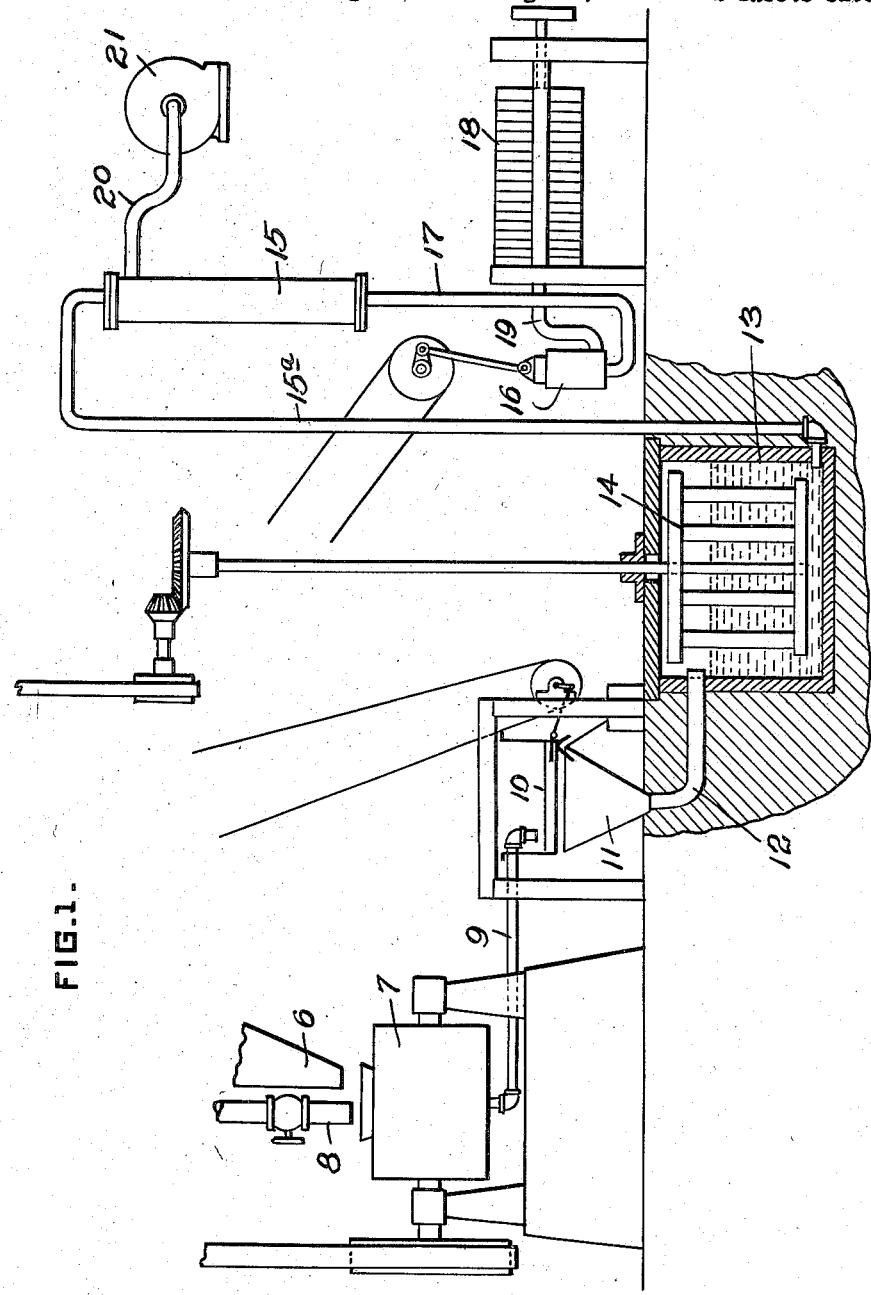

Nov. 10, 1925.

G. W. LAPP 1,561,002

METHOD OF PRODUCING CLAY BODIES AND APPARATUS USED

Original Filed Aug. 27, 1919    2 Sheets-Sheet 1

WITNESSES

J. Herbert Bradley

INVENTOR
Grover W. Lapp.
By Greer and McAllister
His Attorneys.

Nov. 10, 1925.
G. W. LAPP
1,561,002
METHOD OF PRODUCING CLAY BODIES AND APPARATUS USED
Original Filed Aug. 27, 1919   2 Sheets-Sheet 2
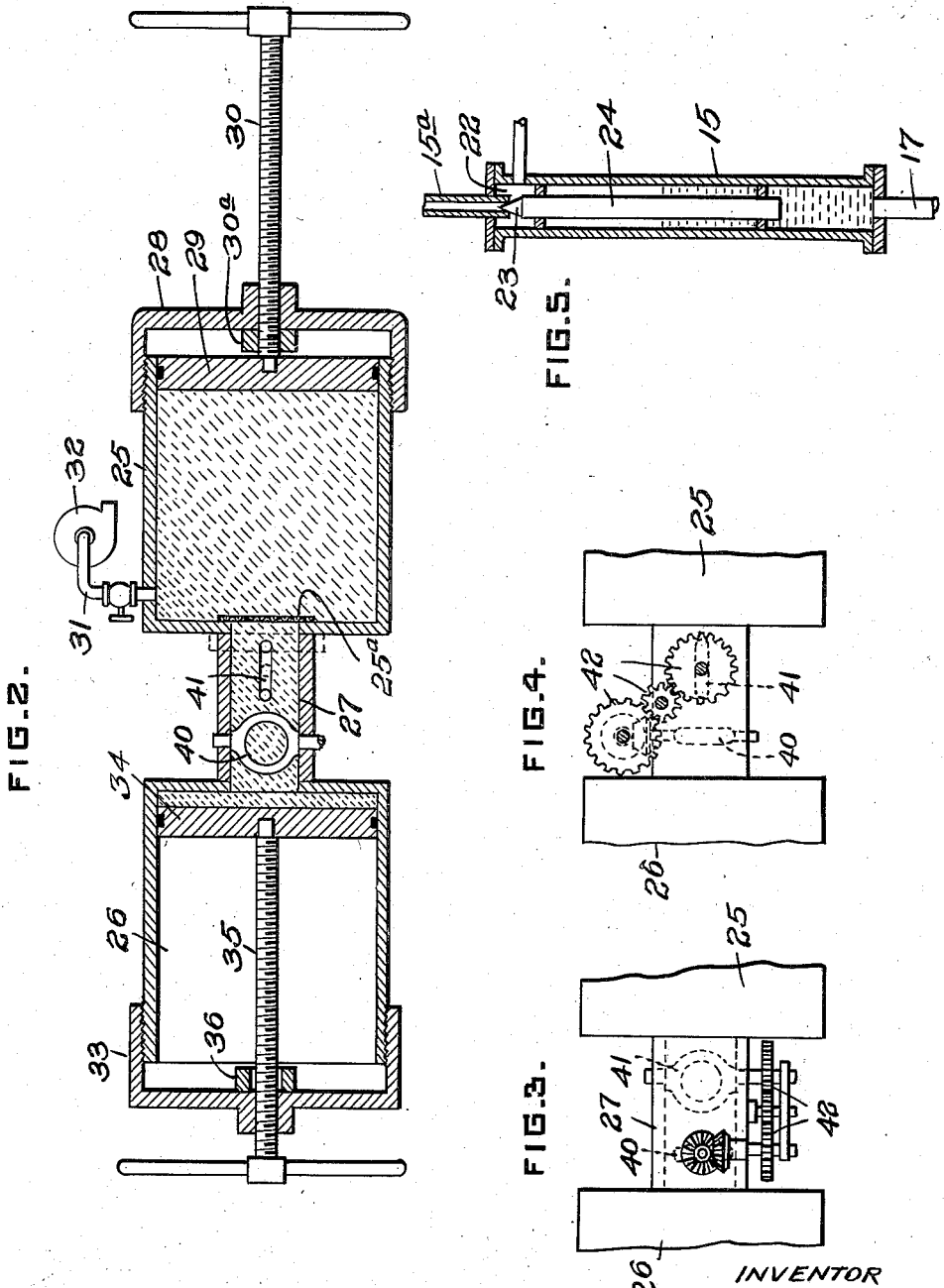
WITNESSES
INVENTOR Patented Nov. 10, 1925.

1,561,002

UNITED STATES PATENT OFFICE.

GROVER W. LAPP, OF LE ROY, NEW YORK, ASSIGNOR TO LAPP INSULATOR COMPANY, INC., A CORPORATION OF NEW YORK.

METHOD OF PRODUCING CLAY BODIES AND APPARATUS USED.

Original application filed August 27, 1919, Serial No. 320,163. Divided and this application filed June 9, 1922. Serial No. 567,027.

*To all whom it may concern:*

Be it known that I, GROVER W. LAPP, a citizen of the United States, and a resident of Le Roy, in the county of Genesee and the State of New York, have made a new and useful Invention in Methods of Producing Clay Bodies and Apparatus Used, of which the following is a specification.

This invention relates to ceramics and more particularly to the treatment of clay or clay bodies for use in producing ceramic wares and apparatus used therefor.

This application is a division of application Serial No. 320,163 filed by me on August 27, 1919.

In the preparation of clay bodies for use in the production of ceramic wares it is now customary to mix the ingredients with water to form a "slip", then to sift the "slip" through a screen into an agitator storage cistern from which the "slip" is pumped into a filter press where excess water is removed in order to obtain a cake of clay of the average moisture desired. In order to make this cake-material more uniform in moisture content, it is then "pugged" through a mill fitted with knife blade propellers arranged in a screw progression or else it is kneaded between a table and rollers. In both of these working processes some of the trapped air is eliminated and some of it digested by and incorporated in the clay.

These working processes up to a certain point soften the clay and refine the grain thereof, but after such point the clay becomes stiffer and of more open grain and at the same time noticeably warmer. The cause of this deterioration is due to "air" in the clay.

The presence of "air" or other gases in the plastic clay often causes it to issue from the pug mill as a laminated body or structure and even when laminations are not formed the pugging or kneading as now carried on cannot be carried far enough to develop fully in the body the smoothness of grain, uniform density, maximum homogeneity, and bond strength desired. Lack of uniformity causes serious shrinkage and cracking in drying and the presence of variable pore space causes variable shrinkage and inaccurate sizing of the product. The higher the porosity of the unburned body the higher will be the burning shrinkage and less complete vitrification or a loss of strength in the finished ware will be the consequence.

I believe that the source of this "air" or "gas" has not been fully appreciated, nor has direct removal thereof under the present methods been accomplished. When it is known that the total air or other gas in the clay may be over twenty-five per cent of the volume of the clay body the possible injury to the body on this account can be readily appreciated.

Part of the air contained in the clay "slip" as well as in the "pugged" clay is in the form of bubbles minutely subdivided during the mixing operations and retained in the body mixture. Another part of the air present is in actual solution in the water of the mixture. The water generally used for mixing is cold and under a pressure above atmospheric pressure so that it readily retains in solution a considerable percentage of its own volume of dissolved air or gas. When reduced to atmospheric pressure and raised in temperature in the mixing tub or blunger the water actually becomes saturated with dissolved air and gas. My experiments have led me to believe that the clay as now worked is fairly oozing with air.

When the clay is pugged or kneaded the mechanical work expended thereon further increases its temperature and causes it to discharge more of the dissolved air or gas which together with air from trapped air bubbles trails in the wake of the cutting knives of the pug mill and causes the laminated structure referred to. Even when distinct laminations are not formed the intimate incorporation of air with the clay causes the grain of "over-worked clay" to be opened and the body to become "short" or mealy instead of smooth and having the buttery "feel" of good-working plastic clay. Such clay often becomes so stiff that it refuses to flow freely through the die of the pug mill nozzle and when "over worked" between the rollers and table it also becomes stiff and inferior.

It has been customary in order to improve clay bodies to "age" the material after it is removed from the filter press. In this "aging" process the clay is batted together in a damp cellar where it is left for a period of time and in this way the gas and air pore space is apparently very slowly dissolved, diffused and liberated at the surface of the clay; at the same time the particles appear to settle together more compactly.

In the manufacture of certain chemical porcelains it has been found that six months aging is not sufficient to produce results but that when eight or ten months are allowed the porcelains can be successfully made. This process of aging has been ascribed to a little understood theory of bacterial action but my experiments lead me to believe that the improvement in the clay bodies obtained by aging is largely due to the reduction of the air content to a point which still leaves much to be desired if the clay is to withstand further intensive mechanical treatment.

Under the prevailing practices the plastic clay body is fed through a "pug mill" employing for finishing a single spiral pushing member or twin worms with axes arranged longitudinally of the stream flow. The pug mill employing a single spiral pusher leaves a weak center to the clay and in the mill using two worms the worms do not intermesh beyond their axes of rotation and two weak centers are therefore produced. An objectionable feature in pugged clay is its laminated structure in the shape of spiral layers which are advanced or pushed ahead at the center of the pug and retarded at the outside on account of friction on the walls of the pug nozzle or die. The cleavage spaces between laminations represent the wake of the pugging members and these spaces are filled with the air present in the clay. These laminations are usually worse at the center because, after they are formed by the spiral cut, the pressure is less at the center and the air therefore flows in that direction. At the same time the clay at the sides is subjected to both pressure and longitudinal shearing motion which tend to heal the clay and scatter the air layer.

Believing that the prevailing practices in the clay industries are the fertile causes of much obscure trouble, an object of this invention is to provide a process whereby the air or gas content of the clay bodies may be more thoroughly removed than has hitherto been possible.

A further object is to provide a process whereby the clay bodies can be safely worked to higher temperatures than heretofore.

A still further object is to provide a process whereby the air or gas also the moisture content of clay bodies may be evenly distributed throughout the body.

A still further object is to provide a method for improving the quality of "slip" for use in the process of casting clay bodies.

A still further object is to provide a process whereby the "aging" of clay bodies may be dispensed with.

In carrying out my process the gas or air may be removed from the "mix" by subjecting the water with which the ingredients are to be mixed or the "slip" after the water is added or the plastic clay to a vacuum. The preferred method is to suck the slip from the agitator storage system through a closed chamber to which an air extracting pump or other device is connected so that as the slip flows through the vacuum chamber the dissolved and free air and gas which it contains will be removed or extracted. The slip free from gas and air, is then forced directly into the filter press and, after the clay has been filter-pressed, the leaves may be fed through the pug mill or kneading machine, and, on account of being free, or substantially free, from air or gas it will have less tendency to form laminations or open grained structure and may safely be worked to a much higher temperature than is now possible.

Instead, however, of using a "pug mill" or a "kneading machine" I prefer to place the press cakes in a closed cylinder connected up to an air extracting pump and then to force the press cakes into a solid air free mass. I then force the compacted mass in the form of a stream through a mixing device provided with moving members which cut across the clay stream past its center of flow. A screen of suitable mesh is placed between said cylinder and the mixing device in order to remove therefrom any shreds, lint or other foreign matter which it may contain.

For the purposes of this application I have shown apparatus by means of which my process may be carried out and in the drawings, Figure 1 is a diagrammatic illustration of a portion of such apparatus, Fig. 2 is a more or less diagrammatic illustration in longitudinal section of a portion of the apparatus and Figs. 3, 4 and 5 are detail views of portions of the same.

In carrying out my process the clay materials, consisting of any desired "mix", are fed from a hopper 6 to a ball mill or blunger 7, into which water is also fed through a controlled pipe 8. The mixed slip material from the blunger is conducted by means of a pipe 9 onto an agitated screen or lawn 10 as is now common. The screened "slip" passes by means of a hopper 11 and pipe 12 into an agitator storage cistern 13 provided with the customary power driven agitator 14. From the bottom of the agitator cistern the slip is sucked up into the top of a closed chamber 15 by means of a sufficient vacuum in chamber 15. Pump 16 withdraws the slip from the bottom of chamber 15 through pipe 17 and forces it into filter press 18 through pipe 19.

The blunger, the screen, the agitator cistern and the filter press may be of ordinary construction operating in the usual manner.

Chamber 15, however, by means of a pipe 20 is connected up to a suitable air removing pump 21 whereby the slip in passing through chamber 15 will have all or the major part of the dissolved and free air or the gases contained therein extracted. The inlet 22 to chamber 15 is controlled by means of a valve 23 (see Figure 5) carried at the upper end of a float stem 24 and this construction is provided in order to maintain automatically constant level of slip in chamber 15 at all times when there is sufficient vacuum whether pump 16 is forcing slip into the filter press or not. When the level of slip rises float 24 rises and causes valve 23 to shut off or to reduce the inflow of slips to chamber 15.

After the clay body has been removed from the filter press, it is thoroughly mixed in order that the moisture content and any pore space still remaining may be evenly distributed throughout the clay body. Clay press cakes formed by this process are practically air free and they can be pugged or kneaded to produce a better quality of "body" than can be made from cakes not formed from air free slip. However, when the leaves of clay are fed to the pug mill or rolling table, a large percentage of volume of air is trapped and is only partly eliminated during the early stages of working. The remainder is occluded in the mass of clay and becomes subdivided into minute blebs. It is difficult to prevent this air content from reappearing in the wake of the cutting members of the pug mill in the form of cleavages separating the clay into laminations.

From the foregoing considerations it will be seen that the elimination of this air trapped during mechanical mixing is an important step in the production of an ideal air free body.

The device which I have chosen for carrying out this mixing step of my process consists of two cylindrical chambers 25 and 26 connected by a cylindrical passage 27 of reduced cross section. Chamber 25 is provided with a head 28, a piston 29 and a hand operated screw 30 for forcing piston 29 toward passage 27 in order to compact the clay body and force it through said passage 27.

Chamber 25 is also preferably connected through a pipe 31 to a vacuum pump or other air removing device.

The removal of air from the receptacle or chamber 25 is a preliminary step, the receptacle being exhausted as soon as the filter-press cakes are in place therein. It is desirable to remove the air so that the cakes will not trap air when they are compressed into a compact mass in the succeeding operation. For this reason the receptacle is so formed that it is not completely filled by the filter cakes prior to the compressing operation hereinafter described. In addition the shape of the filter-press cakes is such as to provide ample connected space between the cakes and also between the cakes and the walls of the receptacle to insure a complete evacuation of the receptacle and a minimum trapping of air.

Chamber 26 is provided with a head 33 and a piston 34 to which a threaded rod 35 is revolvably attached, a split nut 36 carried by head 33 is adapted to either engage threaded rod 35 or to be disengaged therefrom.

Passage 27 connecting chambers 25 and 26 is protected by a screen 25$^a$ and is provided with a mixing or kneading device preferably consisting of two ring-like displacer members 40 and 41 mounted on trunnions which project through the passage walls. The axes of these trunnions stand at right angles one to the other. The ring-like members through their trunnions are geared together by means of a gear train 42 which is driven by power. It will be noted that these ring-like members in rotating in the clay stream (the stream moving from cylinder 25 to cylinder 26) traverse the stream past its center of flow so that the stream is cut across past its center whereby a thorough kneading or mixing takes place and this is accomplished without the formation of laminations. The mixed stream issuing from passage 27 emerges into chamber 26 gradually displacing or moving piston 34 away from passage 27.

After chamber 26 is filled with the thoroughly mixed and kneaded clay it is extruded through a die or nozzle, or if desired, the operation may be reversed and the clay forced from the chamber 26 by means of screw 35 (after closing split nut 36 and after removing screen 25$^a$) through passage 27 in the reverse direction into chamber 25 displacing piston 29 (split nut 30$^a$ having been released for that purpose). By carrying on this operation of forcing the clay body back and forth from one chamber to the other (which chambers with passage 27 form a closed system) the working and refinement of the clay body may be carried to any extent desired without the intrusion of air.

The type of transverse mixing mechanism shown in one form in Fig. 2 comprising the cylinder 27 and the moving displacer members 40 and 41 may take other forms which will produce similar action. For example the transversely moving members may consist of a rod or set of rods in the form of a grating or a screen reciprocated in a plane or rotated so as to cut across the stream of flow transversely carrying portions of the mixed material from the center toward the outside and other portions from the outside toward the center. Other types of mixing devices have not this transverse intermixing power so that portions of material at the outside remain largely outside and the center of flow retains its center position. The result is that clay from one part of the stream is less dense or different than clay from another part.

So decidedly effective is this mixing device that even when the clay is passed through it after coming from the usual pug mill the resulting clay is far superior to clay directly from the pug mill.

It will be understood that the air and other gases contained in the water or mixture may be removed or extracted at any point in the process, but it is preferable to remove them just before the slip enters the filter press. If desired, vacuum chamber 15 may be formed in the nature of a jet condenser chamber so that the slip entering the same will be broken up into spray thus facilitating the removal of the air or other gases by means of the vacuum pump.

In place of a vacuum pump it will be understood that an ejector type of pump, a Westinghouse-Leblanc pump, or any suitable device for creating and maintaining a relatively high vacuum may be used. The same sort of a device may be used in connection with chamber 25 and when so used it will be preferable to place a valve between the extracting device and chamber 25 in order to close off the passage to the extracting device during the compression and compacting of the press cakes.

The importance of having plastic material free from gas is vital in the production of ceramic wares. The presence of gases in material for molded insulation, for rubber, for food products, for paints and a variety of plastic bodies represents an impurity in some cases or is a foreign element which weakens the structure of the material by prevention of proper bonding and by increasing the pore space.

The scope of this invention and its application should not be limited to plastic material for ceramic wares but should apply to the preparation of other plastic materials.

Having thus described my invention, what I claim is:—

1. That step in the art of preparing clay for use in producing ceramic ware, which consists in subjecting a moving mass of clay in plastic state to a mixing action in which portions of the mass are moved across the longitudinal axis thereof.

2. That step in the art of preparing plastic material for use in producing ceramic ware, which consists in causing material in plastic state to flow as in a stream and in mixing the material of the stream by means of displacer members which are caused to cross the stream past its center of flow.

3. That step in the art of preparing plastic material for use in producing ceramic ware, which consists in subjecting a moving mass of material to a mixing action in which portions of the mass are moved from one side thereof to the other and crosswise of its longitudinal axis.

4. The method of preparing material for use in the production of ceramic ware, which consists in forcing plastic material from one container to another through a relatively constricted passage and during its travel through such passage in causing the material to move from one side of said passage to the other across the major axis thereof.

5. The method of preparing material for use in the production of ceramic ware, which consists in forcing plastic material from one container to another through a relatively restricted passage, in screening such material prior to its entrance to said passage and in causing the material traversing said passage to move about two axes located at approximately right angles one to the other.

6. The method which consists in compacting filter press cakes of material within a container maintained at sub-atmospheric pressure, in forcing said material from such container through a relatively restricted passage to an expansible container, in expanding said latter container as it fills with such material, and in kneading such material in its travels through said passage.

7. The method of preparing plastic material for use in the production of ceramic ware, which consists in occasioning a flow of said material in a well defined stream and in subjecting the material of the moving stream to a mixing action by displacing portions thereof from one side to the other and across the axis of the stream.

8. The method of preparing plastic material for use, which consists in extruding a stream of material from an enclosing chamber and thereby occasioning a flow of the material through a confining passage and in subjecting the extruded material moving through the passage to a mixing action by displacing portions of the material from one side to the other and across the axis of the stream flowing through the passage.

9. A method of preparing plastic material for use, which consists in confining the material in a chamber, extruding the material through an orifice with which the chamber is provided by reducing the volumetric capacity of the chamber, and in subjecting the extruded material to a mixing action while moving in response to the extruding force.

10. A method of preparing plastic material which consists in compacting the plastic material in a chamber from which gaseous fluids have been withdrawn, and extruding the material from the chamber while isolating the extruded material from gaseous fluids.

11. A method of producing a gas-free plastic material which consists in compacting gas-free particles of plastic material in a chamber, from which the gaseous content has been substantially removed, extruding compacted material from the chamber, and subjecting the extruded material to a mixing action while excluding gaseous fluid.

12. The method of producing substantially gas free plastic material which consists in compacting substantially gas-free particles of plastic material in a vacuum chamber, extruding the material from the chamber by reducing the volumetric capacity of the chamber, screening the material extruded and subjecting the screened material to a mixing action, while isolating it from gaseous fluid such as air.

13. A method of preparing plastic material for use, which consists in extruding a stream of material, causing the extruded material to fill and flow through a confining passage, and in subjecting the material traversing the passage to a mixing action by causing portions thereof to move across the axis of the stream traversing the passage.

14. The method of preparing plastic material for use in the production of ceramic ware, which consists in confining the material in a closed chamber and compacting the material within the chamber and extruding it therefrom by reducing the volume of the chamber and in subjecting the material extruded to a kneading action as it moves in response to the extruding force.

15. In combination in a plastic material mixing device, a compacting chamber, having a delivery port formed therein, a passage for receiving material delivered through said port, and a kneading device located in said passage.

16. In combination in a plastic material mixing device, a compacting chamber, having a delivery port formed therein, a passage for receiving material delivered through said port, and a kneading device located in said passage comprising means moving back and forth across said passage in the line of material flow therethrough.

17. A mixing device for plastic material comprising a passage, means for forcing material through the passage, and a kneading device in said passage comprising means movable approximately at right angles across and through the axis of said passage.

18. In combination in a plastic material mixing device, a chamber having an extrusion port formed therein, a passage communicating with said port, a kneading device located in said passage, and means for extruding material through said port and said passage.

19. In combination in a plastic material mixing device, a passage, a screen in said passage, a kneading device in said passage comprising means movable across the axis of said passage, and means for forcing material through said screen and said passage.

20. A compacting and extruding device for plastic material, comprising a chamber having a port for the delivery of material, means for removing gaseous fluid from said chamber, means for subjecting plastic material within said chamber to mechanical pressure and thereby extruding it through said port, a second chamber communicating with said port and receiving material therefrom and means for enlarging the capacity of said second chamber as it receives plastic material.

21. In combination in an apparatus for treating plastic material, two chambers each adapted to receive plastic material, a restricted passage establishing communication between said chambers, means for forcing plastic material from one chamber to the other through said passage and means for kneading the material traversing said passage.

22. An apparatus for treating plastic material comprising two air excluding chambers, a restricted passage establishing communication between said chambers, means for withdrawing gaseous fluid from said chambers, and means for reducing the volumetric capacity of one chamber while increasing the volumetric capacity of the other and thereby extruding plastic material through said passage.

23. An apparatus for treating plastic material, comprising two air excluding chambers, a restricted passage establishing communication between said chambers, means for reducing the internal volume of one chamber and increasing the internal volume of the other and for thereby forcing material through said passage, and a kneading device in said passage.

24. An apparatus for treating plastic material comprising two air excluding cylinders, each provided with a port, a piston located in each cylinder, a passage connecting the ports, means for reciprocating said pistons to force material from one chamber to the other back and forth through said passage.

In testimony whereof, I have hereunto subscribed my name this 2nd day of June, 1922.

GROVER W. LAPP.